(12) United States Patent
Wagenaar et al.

(10) Patent No.: US 12,026,859 B2
(45) Date of Patent: Jul. 2, 2024

(54) COMPRESSION-AWARE PRE-DISTORTION OF GEOMETRY AND COLOR IN DISTRIBUTED GRAPHICS DISPLAY SYSTEMS

(71) Applicant: Google LLC, Mountain View, CA (US)

(72) Inventors: Hendrik Wagenaar, Santa Clara, CA (US); Alex Olwal, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 160 days.

(21) Appl. No.: 17/643,552

(22) Filed: Dec. 9, 2021

(65) Prior Publication Data

US 2023/0186438 A1 Jun. 15, 2023

(51) Int. Cl.
*G06T 5/80* (2024.01)
*G06T 9/00* (2006.01)

(52) U.S. Cl.
CPC . *G06T 5/80* (2024.01); *G06T 9/00* (2013.01)

(58) Field of Classification Search
None
See application file for complete search history.

(56) References Cited

U.S. PATENT DOCUMENTS

| | | | |
|---|---|---|---|
| 10,572,764 B1* | 2/2020 | Bastani | G06F 3/013 |
| 2015/0379697 A1* | 12/2015 | Pohl | G02B 27/0172 |
| | | | 345/589 |
| 2016/0373734 A1* | 12/2016 | Cole | H04N 13/232 |
| 2017/0099489 A1* | 4/2017 | Gisquet | H04N 19/126 |
| 2019/0377474 A1* | 12/2019 | Neeter | G02B 27/017 |
| 2020/0051219 A1 | 2/2020 | Pohl | |
| 2020/0355925 A1* | 11/2020 | Hu | H04W 4/80 |
| 2021/0211741 A1* | 7/2021 | Andreopoulos | |
| | | | H04N 21/23439 |
| 2022/0067979 A1* | 3/2022 | Chang | H04N 19/184 |
| 2022/0193541 A1* | 6/2022 | Burke | G06T 15/00 |

OTHER PUBLICATIONS

International Search Report and Written Opinion for PCT Application No. PCT/US2022/080341, dated Feb. 14, 2023, 17 pages.
Harding, "North Focals Review: Stealthy, Stylish Smart Glasses", Tom's Hardware, retrieved on May 4, 2020 from https://www.tomshardware.com/reviews/north-focals-smart-glasses-ar,5968.html, Sep. 19, 2019, 17 pages.
Jain, et al., "Towards Accessible Conversations in a Mobile Context for People who are Deaf and Hard of Hearing", Assets'18, Oct. 22-24, 2018, pp. 81-92.
Matthews, et al., "Scribe4Me: Evaluating a Mobile Sound Transcription Tool for the Deaf", LNCS 4206, 2006, pp. 159-176.

* cited by examiner

*Primary Examiner* — James A Thompson
(74) *Attorney, Agent, or Firm* — Brake Hughes Bellermann LLP

(57) ABSTRACT

A method including receiving, by a companion device from an optical display, a distortion information associated with a geometric distortion associated with rendering an image on a display of the optical display, distorting, by the companion device, the image using the distortion information, preprocessing, by the companion device, the distorted image based on compression artifacts, compressing, by the companion device, the distorted image, and communicating, by the companion device, the compressed image to the optical display

20 Claims, 7 Drawing Sheets

COMPRESSION-AWARE PRE-DISTORTION OF GEOMETRY AND COLOR IN DISTRIBUTED GRAPHICS DISPLAY SYSTEMS

FIELD

Embodiments relate to graphics pipelines in distributed graphics systems.

BACKGROUND

Some devices (e.g., wearable devices) can have advanced display capabilities. These devices can be challenged to fit sufficiently capable electronics into a small form factor. These issues become increasingly challenging in applications, such as accessibility, where a device might be expected to be worn for a full day.

Existing commercially available display systems cannot support continuous usage scenarios. For example, head mounted displays are intended for intermittent engagement and are built around phone-class System-on-Chips (SoCs). These devices can provide only a few hours of battery life with the display on. In addition, thermal comfort can be an issue due to the small volume head mounted displays.

SUMMARY

In a distributed graphics display system for an optical display, compression/decompression operations can introduce image artifacts (e.g., due to the offloaded graphics operations) that can have spatial, temporal and perceptual consequences. Example implementations can solve the distortion correction and compression/decompression problems by reducing the negative effects of compression in a distributed graphics display system by adding pre/post processing operations relative to the compression/decompression operations.

In a general aspect, a device, a system, a non-transitory computer-readable medium (having stored thereon computer executable program code which can be executed on a computer system), and/or a method can perform a process with a method including receiving, by a companion device from an optical display, a distortion information associated with a geometric distortion associated with rendering an image on a display of the optical display, distorting, by the companion device, the image using the distortion information, preprocessing, by the companion device, the distorted image based on compression artifacts, compressing, by the companion device, the distorted image, and communicating, by the companion device, the compressed image to the optical display.

Implementations can include one or more of the following features. For example, the geometric distortion associated with rendering an image on a display of the optical display can be based on light distortion associated with at least one of radial distortion, chromatic aberration, aberration distortion, a curvature and a magnification of an optical lens of the display of the optical display. The preprocessing of the distorted image can include remapping non-zero colors to higher bits. The preprocessing of the distorted image can include clamping pixel values of the distorted image to discard low intensity values. The preprocessing of the distorted image can include reducing bit-depth associated with pixel values of the distorted image. The preprocessing of the distorted image can include encoding monochrome graphics in a luminance channel of the distorted image.

The compressing of the distorted image can include compressing color channels separately and communicating the compressed image includes communicating the compressed color channels separately. The method can further include generating, by the companion device, a distortion mesh based on the distortion information, wherein the distorting of the image includes rendering the image on the distortion mesh. The method can further include color correcting, by the companion device, the distorted image using the distortion information. The method can further include generating, by the companion device, a distortion mesh based on the distortion information. The distortion mesh can include color distortion correction information, the distorted of the image can include rendering the image on the distortion mesh, and the distorting of the image can include color correcting the image. The method can further include pairing the companion device with the optical display. The companion device can be a mobile computing device, and the optical display can include at least one optical lens and the distortion information is received during the pairing.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Wearable display systems can depend on a smartphone to drive a display. Some systems can use a physical cable between a smartphone or a dedicated graphics processing unit. However, a wireless connection is preferred because of a possible broader consumer adoption. Bandwidth limitations and synchronization requirements in the graphics pipeline for wearable display systems can have implications on performance. The performance problems can impact display framerate and introduce visual artifacts (e.g., flickering and tearing).

Therefore, computationally expensive operations such as distortion correction for wearable display optics might not always be possible to execute efficiently on a low-power embedded system. Display architectures for thin-client wearables, however, have the opportunity to reduce their onboard power and thermal footprint, by offloading computation-intensive graphics operations to a companion device (e.g., a mobile device, a smartphone, and/or the like).

Figure 1:
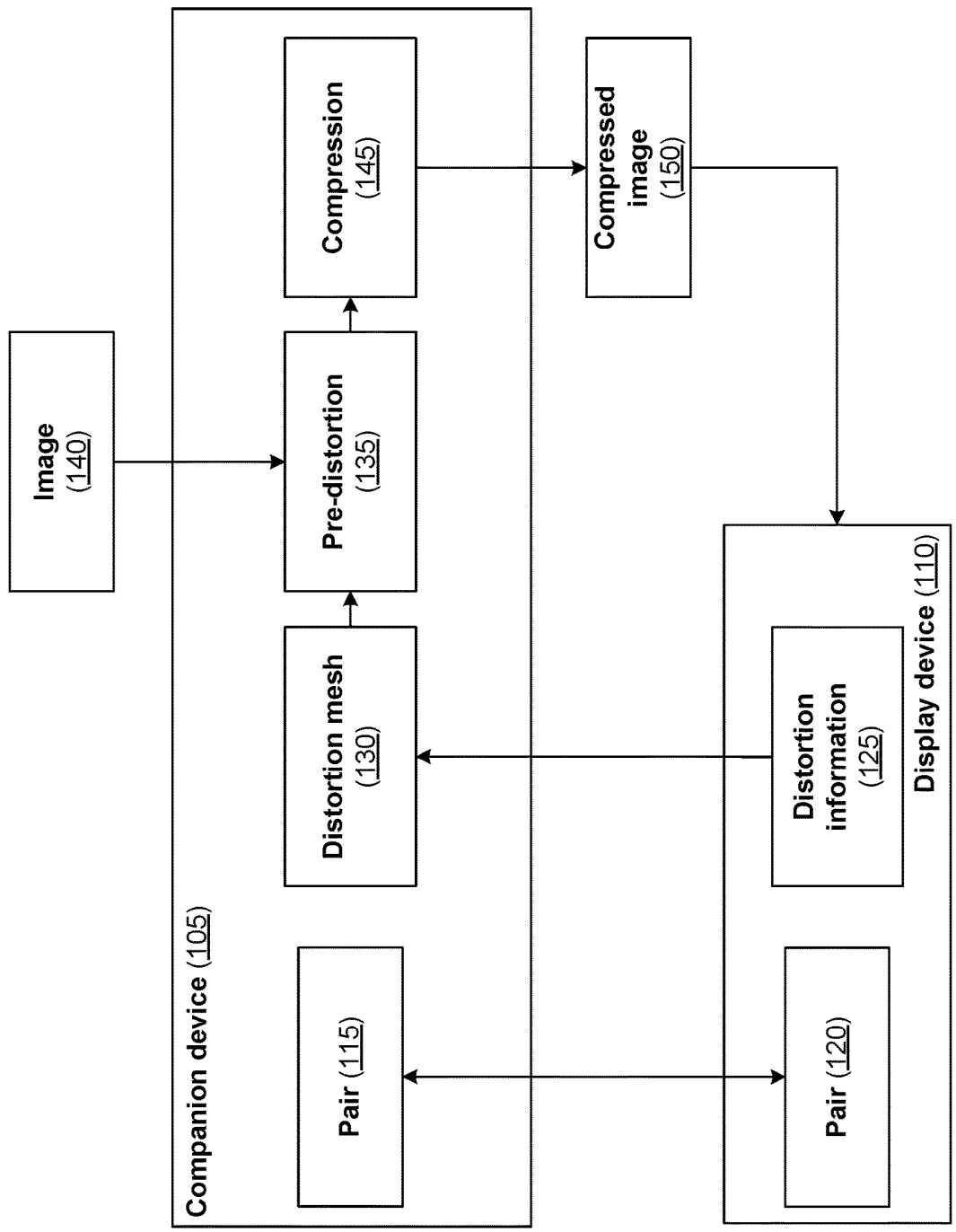
FIG. 1 illustrates a block diagram of a distributed graphics pipeline according to an example implementation.

Bandwidth constraints (e.g., associated with using transmission protocols such as Bluetooth and Bluetooth Low Energy) can impose limitations on the streamed contents, requiring time-based, lossy compression for high-frame rate graphics contents. The compression/decompression operations can introduce image artifacts (e.g., due to the offloaded graphics operations) that have spatial, temporal and/or perceptual consequences. Example implementations can solve the distortion correction and compression/decompression problems by mitigating, minimizing, and/or reducing the negative effects of compression in a distributed graphics display system by adding pre/post processing operations relative to the compression/decompression operations. For example, by co-designing the distortion, preprocessing, compression, and postprocessing steps in the graphics pipeline performance and image quality can be improved. FIG. 1 is an example of this graphics pipeline FIG. 1 illustrates a block diagram of a distributed graphics pipeline according to an example implementation. As shown in FIG. 1, the distributed graphics pipeline can include a companion device 105 (e.g., a mobile device) and a display device 110 (e.g., a head mounted display). The companion device 105 includes a pair 115 block, a distortion mesh 130 block, a pre-distortion 135 block and a compression 145 block. The display device 110 includes a pair 120 block and a distortion information 125 block. The companion device 105 can be configured to generate a compressed image 150 based on an input image 140.

The pair 115 and the pair 120 can be configured to communicatively couple the companion device 105 and the display device 110. For example, the pair 115 and the pair 120 can be communicatively coupled using a wireless standard (e.g., Bluetooth, Bluetooth Low Energy, wireless Ethernet, WIFI, and, or the like) and/or a wired standard (e.g., USB, Ethernet, and/or the like).

Optical optics (e.g., lenses) can introduce some form of spatial distortion (e.g., barrel distortion, pincushion distortion, or complex distortion). Display systems can at least partially correct for these spatial distortions by performing one or more warp transforms on each buffered image so as to compensate the spatial distortion either present in the buffered image or that will be introduced when the buffered image is viewed through the lenses in an eyepiece.

The distortion information 125 can include any data, configuration setting(s), calibration setting(s), mesh(s), and/or information associated with graphic and/or color distortions associated with a display of an image on a display of the display device 110. Display optics in head mounted displays (e.g., augmented reality, virtual reality, eyewear displays, and/or the like) can introduce warping in a displayed image. Therefore, an onboard distortion correction and/or a color correction transformation (e.g., in laser-based systems) can be performed by the head mounted display by performing one or more warp transforms. This distortion correction (e.g., pre-warp process) may be performed such that each of the left-side and right-side image textures have a separate warping. For example, a display system can be configured to implement a different spatial distortion map for each lateral section of a display panel.

These correction operations can be computationally expensive and typically leverage hardware acceleration using graphical processing units (GPUs) which can have power consumption and thermal implications. Therefore, example implementations can include and/or generate distortion information 125 (e.g., similar to data and/or information used by the GPU) and communicate the distortion information 125 to the companion device 105 such that the companion device 105 can perform the distortion correction and/or a color correction transformation. At least some technical effects of the companion device 105 performing the distortion correction and/or a color correction transformation can include a reduced power consumption and/or a reduction of heat generated when rendering an image.

In an example implementation, the companion device 105 includes the distortion mesh 130. The distortion mesh 130 can be (or can be generated using) a distortion map (e.g., included with the distortion information 125) for the display of the display device 110. The distortion mesh 130 can be generated, recalled from a memory (e.g., a cache), and/or the like by the companion device 105. The distortion mesh 130 can be used by the companion device 105 to generate a pre-distortion 135 image contents corresponding to image 140 before a compression 145 operation is performed on the image 140 to generate the compressed image 150. In other words, the compressed image 150 is pre-distorted to compensate for warping and/or color inconsistencies associated with the display associated with the display device 110. Therefore, the display device 110 may not have to do any processing to correct for warping and/or color consistencies and can decompress and/or render an image corresponding to image 140 without additional processing. The distortion mesh 130 can also include a color vertex color data used for color uniformity correction.

FIG. 2A to FIG. 2D illustrate example graphics pipelines including offloading geometry distortion correction and color uniformity correction from a display system or device to a compression or companion system or device. The graphics pipelines can include at least one of a distortion correction 210 block, a color uniformity 215 block, a distortion map 225 block, a color correction map 230 block, and a distortion correction+per-vertex color correction 235 block.

Some displays including head mounted displays can include glass lenses. A physical distortion of the glass lenses can cause a displayed image to be visibly distorted due to light distortion associated with a curvature, a magnification of the glass lenses, radial distortion, chromatic aberration, aberration distortion, barrel distortion, pincushion distortion and/or the like. A distortion (sometimes called a geometry or a geometric distortion) correction can be implemented in the display engine 220 by rendering each eye display into a separate render target and then warping that image in a post process operation (e.g., in a pixel shader, or by projecting the render target onto a warped mesh) and rendering the final output to the display. The displays described herein are often referred to as a head mounted display (HMD). However, other types of displays can use optical lenses. For example, the display can be implemented in eyeglasses and/or contact lenses. For example, the display can be implemented in a projection display (e.g., a heads-up display or virtual display). In other words, any type of optical display or optical lens display can use the techniques described herein.

In example implementations, the distortion correction 210 is implemented before rendering a decompressed image corresponding to the image 205 on the display. Therefore, the distortion correction 210 can be configured to correct for image distortion caused by the physical distortion of the glass lenses before the rendering process performed by the display engine 220. The distortion correction 210 can use the distortion map 225 that includes the parameters used to generate a mesh used to warp an image. The distortion map 225 can include a mapping for each of the lenses of the display (and display panel if required). The distortion map 225 can be configured based on a curvature, a magnification of the glass lenses, radial distortion, chromatic aberration, aberration distortion, barrel distortion, pincushion distortion and/or the like, and anticipated distortion introduced by the lens, and/or the like. For example, if the lens introduces a pin-cushion distortion, the distortion map 225 can be configured to introduce a compensatory barrel distortion, with the particular parameters of the barrel distortion determined from the parameters of the lens.

The distortion correction 210 can be configured to apply the distortion map 225 (e.g., as a mesh) to the image 205 to generate a distorted (e.g., pre-warped) image. The distorted image is then used by the display engine 220 to drive a display panel such that the pre-warped image is displayed on the display (e.g., optical display). The image displayed on the display should not show or show a minimal amount of optical distortion. In other words, using the distorted image, distorted (e.g., warped) using the distortion map 225, can partially or completely counteract, or complement, the spatial distortion introduced by the optical elements of the display device, thereby presenting a continuously undistorted, substantially rectilinear image to the user's eye.

As discussed above, displays may use optical elements to guide and manipulate light to form images. Such optical elements may cause non-uniformities in the displayed images. Some of these non-uniformities may include variations in intensity or color balance across the field of the image. The color distortion can be corrected using at least one of a gamma color correction process, a color uniformity correction process, and/or a color blending process together referred to as color uniformity 215.

In example implementations, the color uniformity 215 is implemented before rendering a decompressed image corresponding to the image 205 on the display. Therefore, color uniformity 215 can be configured to correct for color distortion or discontinuity caused by the optical elements before the rendering process performed by the display engine 220. The color uniformity 215 can use a color correction map 230 that includes the parameters used to modify pixel values of an image. The color correction map 230 can be included for each of the lenses of the display (and display panel if required).

The color correction map 230 can include a corresponding correction map for each color (e.g., RGB, RGBD, YUV, and/or the like), and that each color may be adjusted based on a corresponding color correction map 230. The color correction map 230 can be configured to reduce at least one of an intensity non-uniformity and a color balance non-uniformity of the image when displayed. In other words, the color correction map 230 can be used to enable (or help enable) the color uniformity 215 to adjust pixel values in an image such that at least one characteristic of a displayed light is adjusted such that intensity, polarization, and the like are corrected generating an image for display by the display engine 220.

Implementing the geometric distortion correction and/or the color distortion correction on the companion device can cause spatial and/or temporal channel crosstalk and/or artifacts when compressing the corrected image. Therefore, the companion device can include pre-processing (e.g., before compression) and the display device can include post-processing (e.g., after decompression). Pre-processing and/or post-processing can be configured to mitigate or minimize compression artifacts (e.g., a noticeable distortion of media (including images, and video) caused by image compression.

The order of operations associated with the graphics pipeline can matter. For example, if after decompression the color uniformity 215 is applied after the distortion correction 210 (e.g., as in FIG. 2A), then color correction map 230 used by the color uniformity 215 can be a subset of the correction image. Alternatively, the distortion correction 210 can be applied before compression/decompression (e.g., as in FIG. 2B). This pipeline may use three lookups in the texture layer of the image 205 because the R, G and B components may use the distortion-corrected UV coordinates.

Figure 2A:
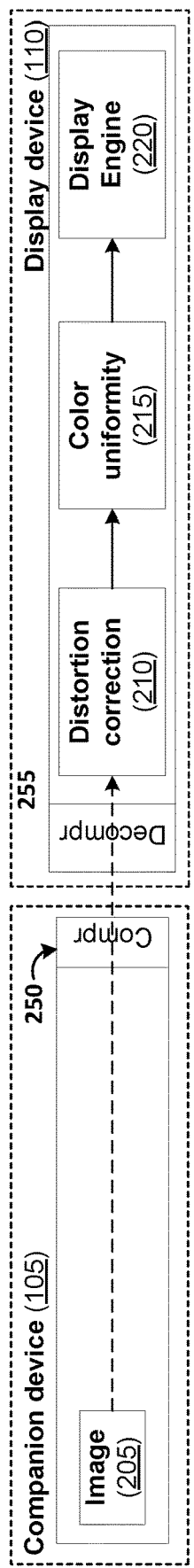
FIG. 2A illustrates a block diagram of a graphics pipeline processing distribution according to an example implementation.

FIG. 2A illustrates a block diagram of a graphics pipeline processing distribution. As shown in FIG. 2A, the display device 110 includes the distortion correction 210 block, the color uniformity 215 block, and the display engine 220 block. In the example implementation shown in FIG. 2A, distortion correction and color uniformity and/or color correction are performed before the graphical processing of a decompressed image corresponding to the image 205. The distortion correction 210 and the color uniformity 215 can be accomplished by modifying (e.g., warping, pixel value adjustment, and/or the like) the decompressed image corresponding to the image 205. This graphics pipeline can be more flexible (as compared to performing distortion correction and and/or color correction in the display engine 220) because the distortion correction 210 and/or the color uniformity 215 can be tuned by varying parameters (e.g., map values) associated with the distortion correction 210 and/or the color uniformity 215.

Figure 2B:
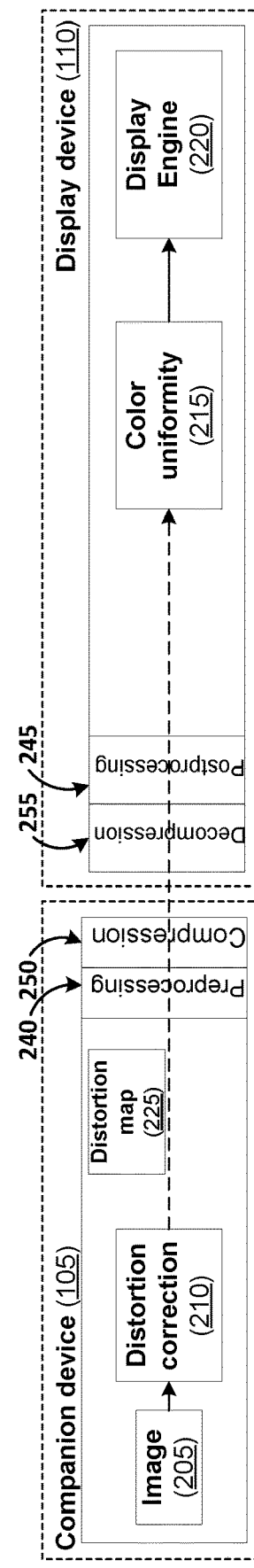
FIG. 2B illustrates a block diagram of a graphics pipeline processing distribution according to an example implementation.

FIG. 2B illustrates a block diagram of a graphics pipeline processing distribution according to an example implementation. As shown in FIG. 2B, the display device 110 includes the color uniformity 215 block, and the display engine 220 block. In addition, the companion device 105 includes the distortion correction 210 block. The benefits (or technical effect) of the companion device 105 performing the distortion correction 210 on the image 205 can be minimizing power consumption and minimizing the thermal impact of graphical processing in the display device 110. The distortion correction 210 can be accomplished by modifying (e.g., warping) the image 205 prior to compressing the image 205. The distortion correction 210 can use the distortion map 225 to provide parameters used in, for example, warping the image 205. The distortion map 225 can be generated by the display device 110 and communicated to the companion device 105, generated by the companion device 105 based on distortion information communicated by the display device 110, recalled from a memory (e.g., a cache) of the companion device 105, and/or the like.

Implementing the distortion correction 210 on the companion device 105 can cause spatial and/or temporal channel crosstalk and/or artifacts when compressing the corrected image. Therefore, the companion device 105 can include preprocessing 240 (before compression 250) and the display device 110 can include postprocessing 245 (after decompression 255). Preprocessing 240 and/or postprocessing 245 can be configured to mitigate or minimize compression artifacts (e.g., a noticeable distortion of media (including images and video) caused by image compression.

Examples of compression artifacts can include temporal artifacts, channel crosstalk, spatial resolution and compression quality. Temporal artifacts can be artifacts from prior frames. For example, content from prior frames may not be removed before a next frame is compressed. The blue channel can be most susceptible to temporal artifacts. Channel crosstalk occurs when one channel is visible on another channel. Channel crosstalk can occur during YUV to RGB conversion. For example, R and B channels can leak on to the G channel. This channel crosstalk (or color leakage) can be a visible artifact when viewed on an optical display. Spatial resolution can be a lower resolution in the R and B channels. For example, the R and B channels can have lower luminosity, therefore the ¼ resolution u and v channels can contribute to pixelation. In addition, the overall image quality can degrade due to less efficient compression.

Mitigating and/or minimizing compression artifacts can include clamping, color remapping and/or bit-depth reduction. For example, prior to compression 250 (prepressing 240), non-zero colors can be remapped to the higher seven (7) bits, 0→0, 1 . . . 255→128 . . . 255, for each color channel. Remapping non-zero colors with values below a predetermined value (e.g., 127) can remove any compression artifacts associated with pixel values below the predetermined value. After decompression 255 (postprocessing 245), a reverse mapping can be applied (e.g., 128 . . . 255→1 . . . 255). For example, the table can be changed such that r=max(0, r−128)*2. In an example implementation, a gamma lookup table can be changed to map the pixel values back to values below the predetermined value. Mapping the values back can also incorporate the gamma correction and remap to 16-bit space. This example implementation can sacrifice one (1) bit per channel. However, sacrificing one (1) bit per channel can reduce compression artifacts and improve the compression ratio.

Mitigating and/or minimizing compression artifacts can include aligning channels with transformations for efficient correction. If the distortion correction has a mostly uniform translation between the three color (RGB) channels, prior to encoding to YUV video, example implementations can shift the channels so that the channels are mostly on top of each other (postprocessing 245). Encoding this into YUV can minimize and possibly remove a significant portion of the channel crosstalk. After decoding the video, un-translate the channels. For example, rather than representing the color distortion with a per-pixel map, a geometric transformation that can mitigate the largest effects with translation, scaling or rotation can be used. This implementation can be based on the observation that optomechanical laser systems tend to have similar distortion across channels, given that their physical offset has the largest impact on image distortion. Such operations can be represented in a compact form and implemented efficiently. The transformation could happen during a postprocessing 245.

Mitigating and/or minimizing compression artifacts can include clamping to discard low intensity values that can result from compression artifacts. For example, in order to suppress artifacts, colors can be clamped below predetermined values with varying levels of aggressiveness. The red and blue channels can exhibit the stronger compression artifacts; therefore, example implementations can use channel weights to allow more aggressive clamping on specific (e.g., red and blue) channels. In addition, spatial weighting formulas can be used to clamp differently across the 2D image.

Mitigating and/or minimizing compression artifacts can include encoding monochrome graphics in the luminance channel for single-color display. For example, in RGB-laser-based systems that can dynamically switch to monochrome graphics, significant power, thermal and bandwidth gains can be possible. For monochrome rendering the distortion of the green channel can be output and encoded to the luminance channel (u=0, v=0). Then luminance can be decoded to one of the color channels (e.g., green), and zero out the other channels (e.g., red and blue). This approach can improve compression with similar compression artifacts as on-glasses distortion while rendering in one color.

Mitigating and/or minimizing compression artifacts can include sending color channels separately in order to avoid channel crosstalk during compression. For example, as an extension of the monochrome approach, each channel can be encoded as a greyscale video stream each communicated to the display device 110 separately. The decompressed single-color streams can be recomposed on the display device 110. This implementation may benefit from hardware accelerated compression of 8-bit formats but can alternatively use RGB compression with data in the Y channel and leave the u and v channels as zeros.

Figure 2C:
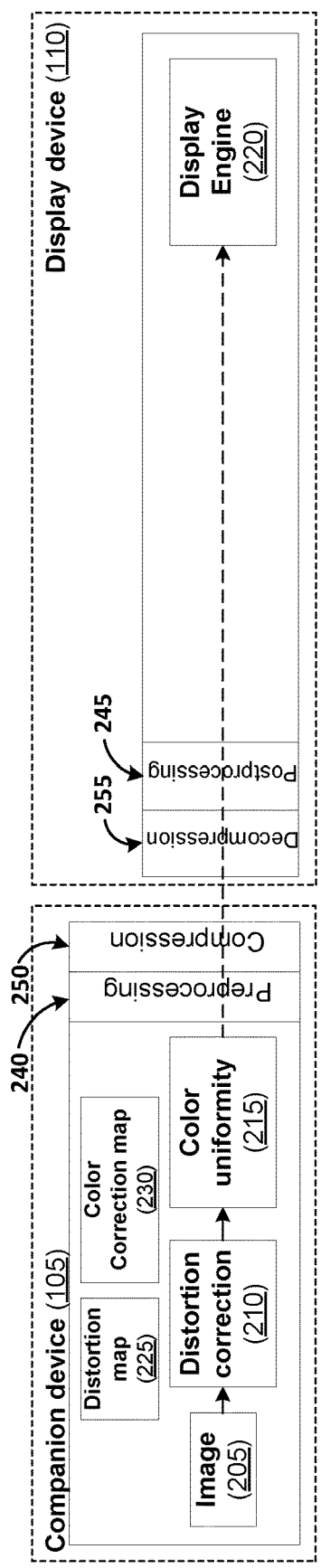
FIG. 2C illustrates a block diagram of a graphics pipeline processing distribution according to an example implementation.

FIG. 2C illustrates a block diagram of a graphics pipeline processing distribution according to an example implementation. As shown in FIG. 2C, the display device 110 includes the display engine 220 block. In addition, the companion device 105 includes the distortion correction 210 block and the color uniformity 215 block. The benefits (or technical effect) of the companion device 105 performing the distortion correction 210 and the color uniformity 215 on the image 205 can be minimizing power consumption and minimizing the thermal impact of graphical processing in the display device 110. The color uniformity 215 can use the color correction map 230 to provide parameters used in, for example, pixel value mapping or modification of the image 205. The color correction map 230 can be generated by the display device 110 and communicated to the companion device 105, generated by the companion device 105 based on distortion information communicated by the display device 110, recalled from a memory (e.g., a cache) of the companion device 105, and/or the like.

Implementing the color uniformity 215 and/or the distortion correction 210 on the companion device 105 can cause spatial and/or temporal channel crosstalk and/or artifacts when compressing the corrected image. Therefore, the companion device 105 can include preprocessing 240 (before compression 250), as discussed in more detail above, and the display device 110 can include postprocessing 245 (after decompression 255), as discussed in more detail above. Preprocessing 240 and/or postprocessing 245 can be configured to mitigate or minimize compression artifacts (e.g., a noticeable distortion of media (including images, and video) caused by image compression.

Figure 2D:
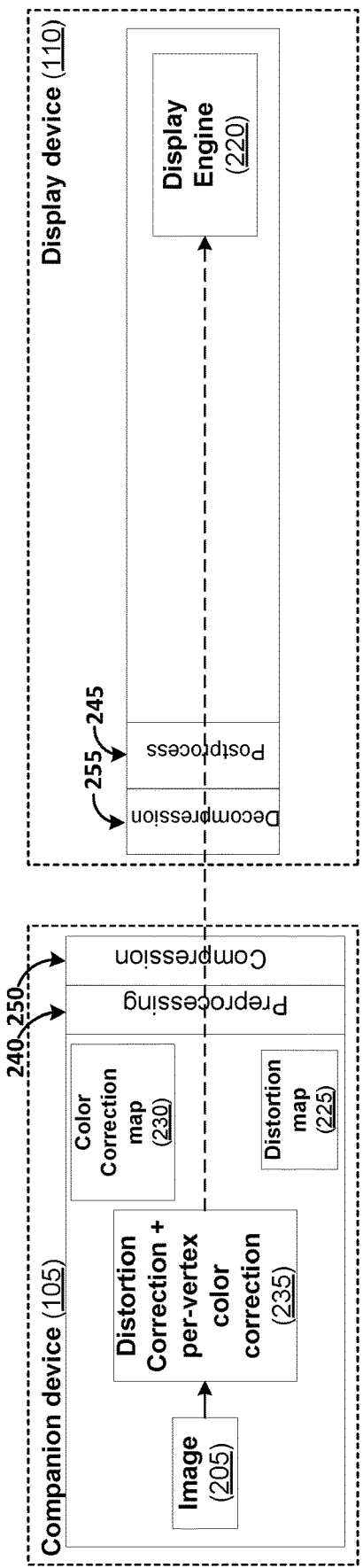
FIG. 2D illustrates a block diagram of a graphics pipeline processing distribution according to an example implementation.

FIG. 2D illustrates a block diagram of a graphics pipeline processing distribution according to an example implementation. As shown in FIG. 2C, the display device 110 includes the display engine 220 block. In addition, the companion device 105 includes the distortion correction+per-vertex color correction 235 block. The benefits (or technical effect) of the companion device 105 performing the distortion correction 210 and the color uniformity 215 on the image 205 can be minimizing power consumption and minimizing the thermal impact of graphical processing in the display device 110. Vertex color can be color channel (e.g., RGB) values associated with each vertex of a mesh.

Accordingly, the distortion correction+per-vertex color correction 235 can be configured to use a mesh for warping distortion correction where the mesh includes color values associated with each vertex of the mesh for warping. The color values associated with each vertex of the mesh for warping can be used for color correction. Using the distortion correction+per-vertex color correction 235, the color correction map 230 can be a vertex color map. The vertex color map can include vertex values associated with modifying each color channel (e.g., RGB) associated with color correcting image 205 before compressing image 205. This can remove the need to store/send separate data for the color uniformity 215 (e.g., the color correction map 230), and can remove texture lookups. Several different values could be stored within the attributes of the mesh.

Implementing the distortion correction+per-vertex color correction 235 on the companion device 105 can cause spatial and/or temporal channel crosstalk and/or artifacts when compressing the corrected image. Therefore, the companion device 105 can include preprocessing 240 (before compression 250), as discussed in more detail above, and the display device 110 can include postprocessing 245 (after decompression 255), as discussed in more detail above. Preprocessing 240 and/or postprocessing 245 can be configured to mitigate or minimize compression artifacts (e.g., a noticeable distortion of media (including images, and video) caused by image compression.

There can be limited bandwidth for communication between the companion device 105 and the display device 110. Accordingly, the companion device 105 can include a compression 250 operation and the display device 110 can include a decompression 255 operation can use any compression/decompression standard used in image and/or video communication. The compression 250 operation and the decompression 255 operation can use any compression/decompression standard used in image and/or video communication.

In example implementations, although the compression standard can be any standard used in image and/or video communication, the compression 250 operation can be configured to compress an image (or frame of a video) that has been corrected for geometric distortion and/or color distortion (as discussed above). This can be important because geometric distortion and/or color distortion correction may not be considered in image and/or video compression standards. For example, geometric distortion and/or color distortion correction may appear as noise (or a degradation of quality) in a compressed image when geometric distortion and/or color distortion correction is not noise. Therefore, any compression technique that may attempt to minimize noise (or a degradation of quality) should be avoided and/or have configuration settings that can override attempts to minimize noise. In other words, example implementations may include a particular consideration of the compression 250 in order to ensure optimal geometric distortion and/or color distortion correction.

The compression 250 operation can use a lossy compression algorithm that can cause image distortion and color distortion in addition to image quality degradation. Therefore, as shown in FIGS. 2B-2D, the companion device 105 can include preprocessing 240 (before compression 250) and the display device 110 can include postprocessing 245 (after decompression 255). Preprocessing 240 and postprocessing 245 can be configured to mitigate or minimize compression artifacts (e.g., a noticeable distortion of media (including images, and video) caused by the application of lossy compression) caused by compression 250.

Figure 3:
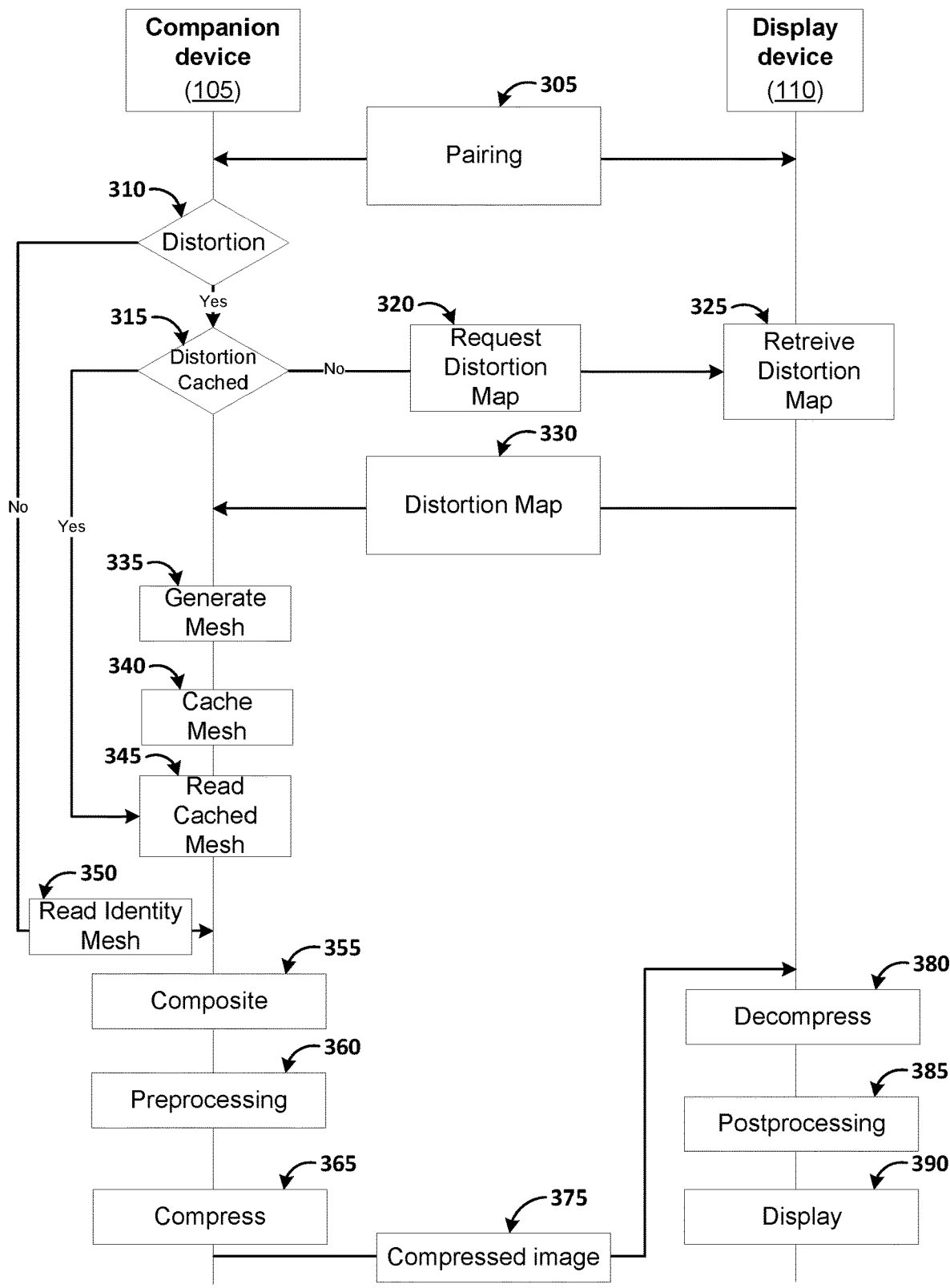
FIG. 3 illustrates a block diagram of a data flow according to an example implementation.

At least a portion of the pipelines described with regard to FIG. 2A to 2B can be implemented in a compositor. The compositor can be configured to generate display images based on the input image (e.g., image 205). The compositor can be configured to generate a display image for the left eye and the right eye in a head mounted display. The compositor can be implemented on a device coupled to the head mounted display. Therefore, the device coupled to the head mounted display includes distortion correction information associated with the head mounted display. For example, the device can be communicatively coupled to or paired with the head mounted display and software on the device coupled to the head mounted display can request a distortion map. If the head mounted display communicates a distortion map to the device, a distortion mesh can be generated. Alternatively, the mesh can be pre-generated and stored on the head mounted display (or is generated on the head mounted display) and is transmitted from the head mounted display to the device. FIG. 3 illustrates an example data flow for communicating head mounted display distortion correction information to the compositor, generating images for display and communicating the images for display to the head mounted display.

FIG. 3 illustrates a block diagram of a data flow according to an example implementation. As shown in FIG. 3, a system includes the companion device 105 (e.g., a mobile device, a mobile phone, and the like) and the display device 110 (e.g., a head mounted display). In block 305 the display device 110 is paired with the companion device 105. For example, the companion device 105 and the display device 110 can be communicatively coupled using a wireless standard (e.g., Bluetooth, Bluetooth Low Energy, wireless Ethernet, WIFI, and, or the like) and/or a wired standard (e.g., USB, Ethernet, and/or the like). The pairing can include communicating display device information. The display device information can include pairing information and (in some implementations) distortion correction information (e.g., a distortion map, a distortion mesh, and/or the like).

In block 310 the companion device 105 can determine if the display device 110 requires distortion correction when displaying an image. For example, the display device information can include an indication that the display device 110 requires distortion correction. If the display device 110 requires distortion correction, processing continues to block 315. Otherwise, processing moves to block 350 where an identity mesh (e.g., a mesh with the value one (1) at all vertices) is, for example, read from a memory of the companion device.

In block 315 the companion device 105 can determine if distortion information (e.g., a distortion map or mesh) associated with the display device 110 is cached (e.g., stored in memory) in the companion device 105. If distortion information associated with the display device 110 is cached, processing continues to block 335. Otherwise, processing continues to block 320. In block 320 the companion device 105 communicates a message to the display device 110. The message can include a request for a distortion map.

In block 325 the display device 110 can retrieve (e.g., receives, gets, obtains, recalls, reads from memory, and/or the like) the requested distortion map. In block 330 the display device 110 communicates a message to the companion device 105. The message can include the requested distortion map.

In block 335 a mesh is generated. The mesh can be a distortion correction mesh (e.g., used to warp an image) with vertices including color correction data (e.g., as in FIG. 2D). Although here and above distortion correction is discussed using a mesh, other image distortion mechanisms are within the scope of this disclosure. In block 340 the mesh is cached (e.g., stored in memory) and in block 345 the mesh is read from the cache. For example, if a mesh is determined to be cached in block 315 a mesh generated in a previous iteration is read from the cache. Otherwise, the mesh generated in block 335 of the current iteration (and just cached in block 340) is read from the cache. In composite 355 block an image (e.g., image 205) is composited. For example, a display image for the left eye and the right eye is generated (e.g., rendered) based on the image. The display images are distortion corrected using the mesh as a preprocess in the compositor operation.

In compression 365 block the images are compressed using a compression standard (e.g., VP9, h.264, and the like). In block 370 the companion device 105 communicates a message to the display device 110. The message can include the compressed images. In decompression 380 block the images are decompressed using the same standard as used to compress the images. Then in block 390 the images are displayed on a display (e.g., left eye and right eye displays) of the display device 110.

As discussed above, implementing the distortion correction (e.g., within the composite 355) on the companion device 105 can cause spatial and/or temporal channel crosstalk and/or artifacts when compressing the corrected image. Therefore, the companion device 105 can include preprocessing 360 (before compression 365) and the display device 110 can include postprocessing 385 (after decompression 380). Preprocessing 360 and/or postprocessing 385 can be configured to mitigate or minimize compression artifacts (e.g., a noticeable distortion of media (including images, audio, and video) caused by image compression. Mitigating or minimizing compression artifacts is discussed in more detail above.

Figure 4:
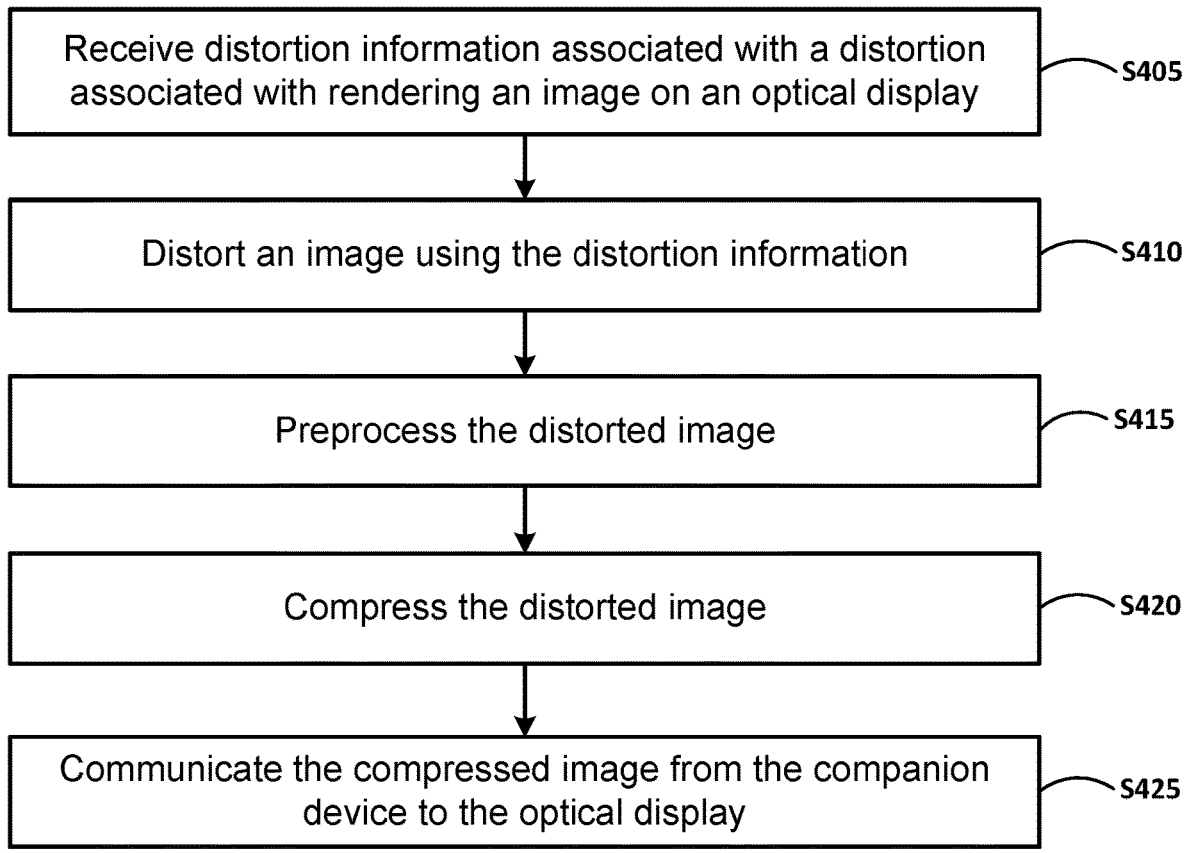
FIG. 4 illustrates a block diagram of a method for compressing an image according to an example implementation.

FIG. 4 illustrates a block diagram of a method for compressing an image according to an example implementation. As shown in FIG. 4, in step S405 distortion information associated with a distortion associated with rendering an image on an optical display is received by a companion device. For example, the companion device can be a computing device (e.g., a mobile computing device, a mobile phone, a laptop computer a tablet, and/or the like). The optical display can be a computing device including at least one display (e.g., a head mounted display). The companion device and the head mounted display can be communicatively coupled (e.g., paired) using a wireless standard (e.g., Bluetooth, Bluetooth Low Energy, wireless Ethernet, WIFI, and, or the like) and/or a wired standard (e.g., USB, Ethernet, and/or the like). The distortion information can include any data, configuration setting(s), calibration setting(s), mesh(s), and/or information associated with graphic and/or color distortions associated with the optical display and/or a display of the optical display.

In step S410 an image is distorted using the distortion information. For example, the distortion information can include a mesh associated with a distortion associated with rendering an image on the optical display. The mesh can be generated by the optical device based on the distortion information. The mesh can be generated by the companion device based on the received distortion information. For example, a distorted image can be generated by combining the mesh with a mesh corresponding to the image in, for example, a compositor. The compositor can be configured to generate display images based on the image (e.g., image 205). For example, generating a combined mesh can include projecting the image (as pixels or as a mesh) on the mesh. The compositor can be configured to generate a display image for the left eye and the right eye in a head mounted display. The compositor can be configured to use the mesh to correct for geometric and color distortions associated with displaying the display image. Combining the cached mesh with the mesh corresponding to the image can be included rendering the image on the cached mesh to warp the image and modify color values (e.g., RGB values, YUV values, and the like) associated with the image.

In step S415 the distorted image is preprocessed. For example, the combined mesh can be preprocessed based on compression artifacts. The combined mesh can be preprocessed to minimize compression artifacts. Examples of compression artifacts can include temporal artifacts, channel crosstalk, spatial resolution and compression quality. In step S420 the distorted (and preprocessed) image (e.g., the combined mesh) is compressed. For example, the combined mesh can be compressed using a compression standard (e.g., VP9, h.264, and the like). In step S425 the compressed image is communicated from the companion device to the optical display. For example, the compressed image (e.g., as a compressed mesh) can be communicated from the companion device to the optical display using the standard used to pair the companion device with the optical display.

Figure 5:
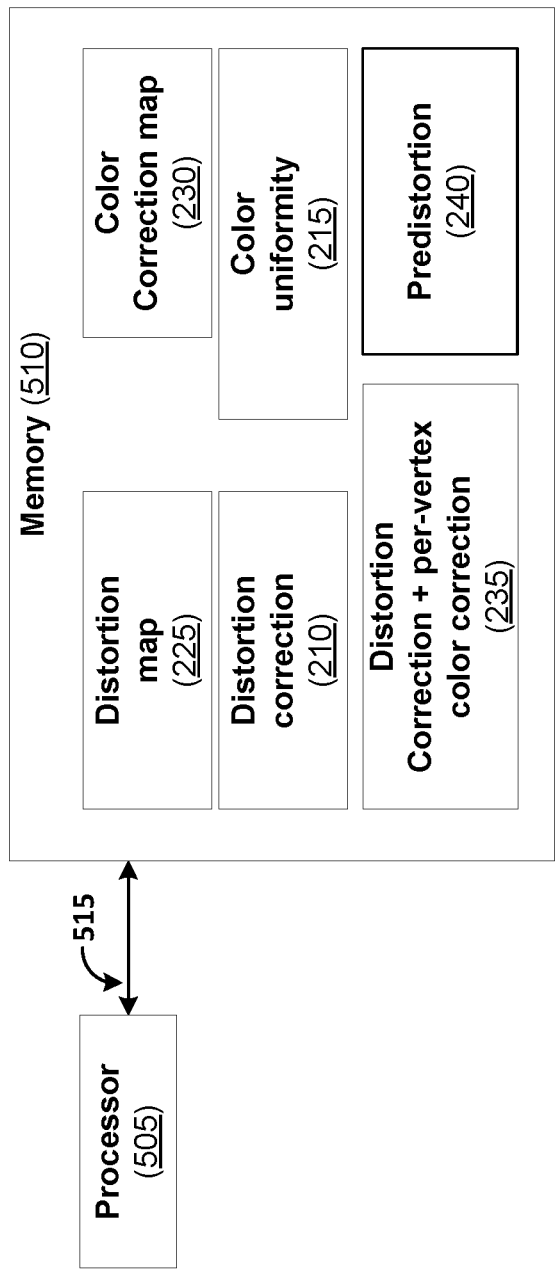
FIG. 5 illustrates a block diagram of a system for compressing an image according to an example implementation.

FIG. 5 illustrates a block diagram of a system for compressing an image according to an example implementation. In the example of FIG. 5, a system (e.g., an augmented reality system) can include a computing system or at least one computing device (e.g., a mobile computing device, a mobile phone, a laptop computer a tablet, and/or the like) and should be understood to represent virtually any computing device configured to perform the techniques described herein. As such, the device may be understood to include various components which may be utilized to implement the techniques described herein, or different or future versions thereof. By way of example, the system can include a processor 505 and a memory 510 (e.g., a non-transitory computer readable memory). The processor 505 and the memory 510 can be coupled (e.g., communicatively coupled) by a bus 515.

The processor 505 may be utilized to execute instructions stored on the at least one memory 510. Therefore, the processor 505 can implement the various features and functions described herein, or additional or alternative features and functions. The processor 505 and the at least one memory 510 may be utilized for various other purposes. For example, the at least one memory 510 may represent an example of various types of memory and related hardware and software which may be used to implement any one of the modules described herein.

The at least one memory 510 may be configured to store data and/or information associated with the device. The at least one memory 510 may be a shared resource. Therefore, the at least one memory 510 may be configured to store data and/or information associated with other elements (e.g., image/video processing or wired/wireless communication) within the larger system. Together, the processor 505 and the at least one memory 510 may be utilized to implement the techniques described herein. As such, the techniques described herein can be implemented as code segments (e.g., software) stored on the memory 510 and executed by the processor 505. Accordingly, the memory 510 can include the distortion correction 210 block, the color uniformity 215 block, the distortion map 225 block, the color correction map 230 block, the distortion correction+per-vertex color correction 235 block, and the predistortion 240. In one or more example implementations, a subset of the components illustrated as included in the memory 510 can be used. For example, the memory 510 can include the distortion correction+per-vertex color correction 235 block without the other components.

As discussed above, the distortion correction 210 can be configured to correct for geometric distortion(s) associated with displaying an image caused by optical display element(s), the color uniformity 215 can be configured to correct for color distortions associated with rendering the image, the distortion map 225 can include information associated with correcting for the geometric distortions, the color correction map 230 can include information associated with correcting for the color distortions, and the distortion correction+per-vertex color correction 235 can be configured to correct for geometric distortion(s) and color distortions. The predistortion 240 and/or postprocessing 245 (e.g., in an optical display device having a similar configuration) can be configured to mitigate or minimize compression artifacts (e.g., a noticeable distortion of media (including images, audio, and video) caused by image compression.

Figure 6:
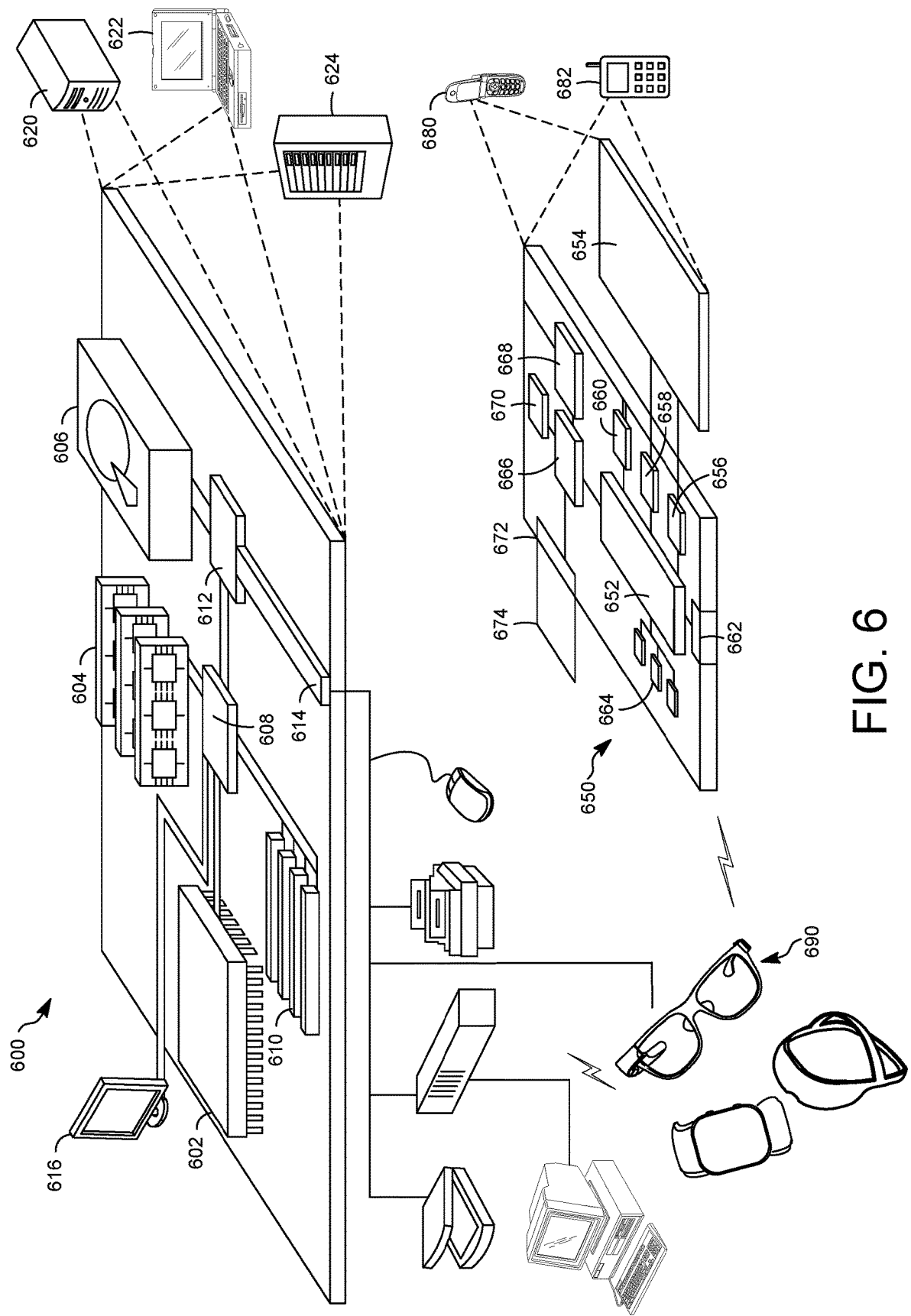
FIG. 6 shows an example of a computer device and a mobile computer device according to at least one example embodiment.

FIG. 6 illustrates an example of a computer device 600 and a mobile computer device 650, which may be used with the techniques described herein (e.g., to implement the companion device 105, the display device 110, and other resources (e.g., network resources)). The computing device 600 includes a processor 602, memory 604, a storage device 606, a high-speed interface 608 connecting to memory 604 and high-speed expansion ports 610, and a low-speed interface 612 connecting to low-speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low-speed controller 612 manages lower bandwidth-intensive operations. Such allocation of functions is example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display), and LED (Light Emitting Diode) or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In-Line Memory Module) card interface. Such expansion memory 674 may provide extra storage space for device 650 or may also store applications or other information for device 650. Specifically, expansion memory 674 may include instructions to carry out or supplement the processes described above and may include secure information also. Thus, for example, expansion memory 674 may be provided as a security module for device 650 and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 690 to generate an augmented environment for viewing inserted content within the physical space. For example, one or more sensors included on a computing device 650 or other computing device depicted in the figure, can provide input to the AR headset 690 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 650 can use the sensors to determine an absolute position and/or a detected rotation of the computing device in the AR space that can then be used as input to the AR space. For example, the computing device 650 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 650 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 650 when the computing device is incorporated into the AR space can cause a particular action to occur in the AR space.

In some implementations, a touchscreen of the computing device 650 can be rendered as a touchpad in AR space. A user can interact with the touchscreen of the computing device 650. The interactions are rendered, in AR headset 690 for example, as movements on the rendered touchpad in the AR space. The rendered movements can control virtual objects in the AR space.

In some implementations, one or more output devices included on the computing device 650 can provide output and/or feedback to a user of the AR headset 690 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 650 may appear as another object in a computer-generated, 3D environment. Interactions by the user with the computing device 650 (e.g., rotating, shaking, touching a touchscreen, swiping a finger across a touch screen) can be interpreted as interactions with the object in the AR space. In the example of the laser pointer in an AR space, the computing device 650 appears as a virtual laser pointer in the computer-generated, 3D environment. As the user manipulates the computing device 650, the user in the AR space sees movement of the laser pointer. The user receives feedback from interactions with the computing device 650 in the AR environment on the computing device 650 or on the AR headset 690. The user's interactions with the computing device may be translated to interactions with a user interface generated in the AR environment for a controllable device.

In some implementations, a computing device 650 may include a touchscreen. For example, a user can interact with the touchscreen to interact with a user interface for a controllable device. For example, the touchscreen may include user interface elements such as sliders that can control properties of the controllable device.

Computing device 600 is intended to represent various forms of digital computers and devices, including, but not limited to laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
   in response to pairing a companion device with a computing device including a display, receiving, by the companion device from the computing device, a distortion information associated with a geometric distortion associated with rendering an image using a lens associated with the display;
   producing a distorted image based on the image using the distortion information;
   processing the distorted image based on a compression artifact;
   producing a compressed image based on the distorted image; and
   sending the compressed image to the computing device.

2. The method of claim 1, wherein the geometric distortion associated with rendering the image using the lens associated with the display is based on light distortion associated with at least one of radial distortion, chromatic aberration, aberration distortion, a curvature and a magnification of the lens associated with the display.

3. The method of claim 1, wherein the processing of the distorted image includes remapping non-zero colors to higher bits.

4. The method of claim 1, wherein the processing of the distorted image includes clamping pixel values of the distorted image to discard low intensity values.

5. The method of claim 1, wherein the processing of the distorted image includes reducing bit-depth associated with pixel values of the distorted image.

6. The method of claim 1, wherein the processing of the distorted image includes encoding monochrome graphics in a luminance channel of the distorted image.

7. The method of claim 1, wherein
   the producing of the compressed image includes compressing color channels separately to produce compressed color channels, and
   the sending of the compressed image includes sending the compressed color channels separately.

8. The method of claim 1, further comprising generating a distortion mesh based on the distortion information, wherein the producing of the distorted image includes rendering the image on the distortion mesh.

9. The method of claim 1, further comprising color correcting the distorted image using the distortion information.

10. The method of claim 1, further comprising:
    generating a distortion mesh based on the distortion information, wherein,
       the distortion mesh includes color distortion correction information,
       the producing of the distorted image includes rendering the image on the distortion mesh, and
       the producing of the distorted image includes color correcting the image.

11. The method of claim 1, wherein
    the companion device is a mobile computing device, and
    the lens includes at least one optical lens, and
    the distortion information is associated with the at least one optical lens.

12. A non-transitory computer-readable storage medium comprising instructions stored thereon that, when executed by at least one processor, are configured to cause a computing system to:
    in response to pairing a companion device with a computing device including a display, receive, by the companion device from the computing device, a distortion information associated with a geometric distortion associated with rendering an image using a lens associated with the display;
    produce a distorted image based on the image using the distortion information;
    process the distorted image based on a compression artifact;
    produce a compressed image based on the distorted image; and
    send the compressed image to the computing device.

13. The non-transitory computer-readable storage medium of claim 12, wherein the geometric distortion associated with rendering the image using the lens associated with the display is based on light distortion associated with at least one of radial distortion, chromatic aberration, aberration distortion, a curvature and a magnification of the lens associated with the display.

14. The non-transitory computer-readable storage medium of claim 12, wherein the processing of the distorted image includes remapping non-zero colors to higher bits.

15. The non-transitory computer-readable storage medium of claim 12, wherein the processing of the distorted image includes clamping pixel values of the distorted image to discard low intensity values.

16. The non-transitory computer-readable storage medium of claim 12, wherein the processing of the distorted image includes reducing bit-depth associated with pixel values of the distorted image.

17. The non-transitory computer-readable storage medium of claim 12, wherein the processing of the distorted image includes encoding monochrome graphics in a luminance channel of the distorted image.

18. The non-transitory computer-readable storage medium of claim 12, wherein the instructions are further configured to cause a computing system to:
    generate a distortion mesh based on the distortion information, wherein,
       the distortion mesh includes color distortion correction information,
       the producing of the distorted image includes rendering the image on the distortion mesh, and
       the producing of the distorted image includes color correcting the image.

19. A mobile device comprising:
    at least one processor; and
    at least one memory including computer program code;
    the at least one memory and the computer program code configured to, with the at least one processor, cause the mobile device to:
    in response to pairing the mobile device with a computing device including a display, receive, by the mobile device from the computing device, a distortion information associated with a geometric distortion associated with rendering an image using a lens associated with the display;
    produce a distorted image based on the image using the distortion information;
    process the distorted image based on a compression artifact;
    produce a compressed image based on the distorted image; and
    sending the compressed image to the computing device.

20. The mobile device of claim 19, wherein the processing of the distorted image includes at least one of:

remapping non-zero colors to higher bits,
clamping pixel values of the distorted image to discard low intensity values,
reducing bit-depth associated with pixel values of the distorted image, and
encoding monochrome graphics in a luminance channel of the distorted image.

\* \* \* \* \*